(12) United States Patent
Uehara

(10) Patent No.: US 12,460,682 B2
(45) Date of Patent: Nov. 4, 2025

(54) DAMPER DEVICE

(71) Applicant: EXEDY Corporation, Neyagawa (JP)

(72) Inventor: Hiroshi Uehara, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 336 days.

(21) Appl. No.: 18/314,043

(22) Filed: May 8, 2023

(65) Prior Publication Data

US 2023/0400068 A1    Dec. 14, 2023

(30) Foreign Application Priority Data

Jun. 8, 2022   (JP) ................. 2022-092783

(51) Int. Cl.
   *F16D 7/02*    (2006.01)
   *F16D 3/12*    (2006.01)
   *F16F 15/129*  (2006.01)

(52) U.S. Cl.
   CPC ............ *F16D 7/025* (2013.01); *F16D 3/12* (2013.01); *F16F 15/1297* (2013.01)

(58) Field of Classification Search
   CPC ......... F16D 7/025; F16D 3/12; F16F 15/1297
   USPC ................................. 464/46, 68.1
   See application file for complete search history.

(56) References Cited

U.S. PATENT DOCUMENTS

| 8,282,494 B2 * | 10/2012 | Saeki ................. F16F 15/1297 |
| | | 464/46 |
| 9,416,845 B2 * | 8/2016 | Usui ..................... F16F 15/134 |
| 12,313,128 B2 * | 5/2025 | Uehara ............... F16F 15/1207 |

FOREIGN PATENT DOCUMENTS

JP         2021196013 A     12/2021

* cited by examiner

*Primary Examiner* — Greg Binda
(74) *Attorney, Agent, or Firm* — United IP Counselors, LLC

(57) ABSTRACT

A damper device includes a torque limiter unit, a damper unit, and a positioning structure. The torque limiter unit includes a damper cover fixed to a surface of a flywheel on a first side of the flywheel in an axial direction. The damper unit is disposed such that an outer peripheral end thereof is located on a second side of an inner peripheral end of the damper cover in the axial direction. The damper unit transmits mechanical power together with the flywheel therebetween. The positioning structure radially sets the damper unit in place with respect to the torque limiter unit by making an outer peripheral surface of a core plate of a friction disc contactable with an inner surface of the damper cover of the torque limiter unit. The damper device is intended to inhibit displacement in radial position of a damper unit with respect to a torque limiter unit.

7 Claims, 3 Drawing Sheets

DAMPER DEVICE

CROSS-REFERENCE TO RELATED APPLICATIONS

This application claims priority to, and the benefit of, Japanese Patent Application No. 2022-092783, filed Jun. 8, 2022. The contents of that application are incorporated by reference herein in their entirety.

TECHNICAL FIELD

The present invention relates to a damper device, particularly to a damper device attachable to a power source-side member.

BACKGROUND

A type of hybrid vehicle including an engine and an electric motor, for instance, uses a damper device having a torque limiter function as described in Japan Laid-open Patent Application Publication No. 2021-196013 in order to prevent transmission of an excessive torque from an output side to an engine side during engine start and so forth.

The damper device described in Japan Laid-open Patent Application Publication No. 2021-196013 is provided with a damper unit, including a pair of plates and a plurality of torsion springs, and a torque limiter unit disposed on an outer peripheral side of the damper unit.

Damper devices of the same type as that described in Japan Laid-open Patent Application Publication No. 2021-196013 are often configured such that the torque limiter unit is fixed to a flywheel, whereas the damper unit is attached to an input shaft of a transmission or so forth. In the configuration described above, especially when the flywheel is fixed to an engine-side member through a flexible plate, chances are that during rotation, a cone spring unevenly applies a pressing force to a friction disc in the torque limiter unit. The friction disc is herein fixed to the damper unit; hence, occurrence of the phenomenon described above results in a drawback that the damper unit is displaced in radial position with respect to the torque limiter unit.

It is an object of the present invention to inhibit displacement in radial position of a damper unit with respect to a torque limiter unit during operation of a damper device.

BRIEF SUMMARY (1) A damper device according to a first aspect of the present invention is attachable to a power source-side member. The damper device includes a torque limiter unit, a damper unit, and a positioning structure. The torque limiter unit includes a cover plate that has an annular shape and is fixed to a surface of the power source-side member on a first side of the power source-side member in an axial direction. The damper unit is disposed such that an outer peripheral end thereof is located on a second side of an inner peripheral end of the cover plate in the axial direction. The damper unit transmits a mechanical power together with a power source therebetween through the torque limiter unit. The positioning structure radially sets the damper unit in place with respect to the torque limiter unit.

In the present damper device, even when the outer peripheral end of the damper unit is disposed on the second side of the inner peripheral end of the cover plate in the axial direction, the damper unit can be radially set in place with respect to the torque limiter unit by the positioning structure.

(2) Preferably, the cover plate includes a friction portion having a disc shape and an attachment portion that is disposed radially outside the friction portion and is attached to the power source-side member. The torque limiter unit further includes a friction disc that is disposed on the second side of the friction portion of the cover plate in the axial direction and is pressed against the friction portion. In this case, preferably, the damper unit includes an input rotor having a disc shape. The input rotor is disposed such that an outer peripheral end thereof is located on the second side of the friction portion of the cover plate in the axial direction. The input rotor receives the friction disc at the outer peripheral end thereof such that the friction disc is fixed at an inner peripheral part thereof to a lateral surface of the outer peripheral end of the input rotor on the first side of the input rotor in the axial direction. The positioning structure radially sets the damper unit in place with respect to the torque limiter unit by making an outer peripheral end surface of the friction disc contactable with the cover plate of the torque limiter unit.

In the present damper device, even when the outer peripheral end of the damper unit is disposed on the second side of the inner peripheral end of the cover plate in the axial direction, the damper unit can be radially set in place with respect to the torque limiter unit by making the outer peripheral end surface of the friction disc fixed to the input rotor on the first side in the axial direction contactable with the cover plate of the torque limiter unit.

(3) Preferably, the friction portion of the cover plate is offset from the attachment portion to the first side in the axial direction. Additionally, the cover plate further includes a coupling portion that extends in the axial direction and couples the friction portion and the attachment portion therethrough. Furthermore, the outer peripheral end surface of the friction disc is contactable with an inner surface of the coupling portion.

(4) Preferably, the friction disc includes a core plate and a pair of friction members fixed to both surfaces of the core plate. In this case, an outer peripheral end surface of the core plate protrudes further radially outward than outer peripheral end surfaces of the pair of friction members so as to be contactable with the inner surface of the coupling portion of the cover plate.

In the present damper device, when the damper unit is radially displaced, the outer peripheral end surface of the core plate of the friction disc fixed to the damper unit is contacted with the inner surface of the coupling portion of the cover plate. Accordingly, it is made possible to inhibit displacement in radial position of the damper unit with respect to the torque limiter unit.

Here, the core plate has a flat plate shape; hence, it is made possible to easily control the outer diameter of the core plate. Because of this, it is made possible to accurately control a gap between the outer peripheral end surface of the core plate and the inner surface of the coupling portion of the cover plate; consequently, it is made possible to further reduce displacement in radial position of the damper unit.

(5) Preferably, the input rotor of the damper unit includes a first plate and a second plate. The first plate receives the core plate at an outer peripheral end thereof such that the core plate is fixed at an inner peripheral end thereof to a lateral surface of the outer peripheral end of the first plate on the first side of the first plate in the axial direction. The second plate is disposed in opposition to the first plate on the second side of the first plate in the axial direction and is fixed to the first plate so as to be non-rotatable relative thereto.

(6) Preferably, the power source-side member is fixed to the power source through a flexible plate.

(7) A damper device according to a second aspect of the present invention is attachable to a power source-side member. The damper device includes a torque limiter unit attached to the power source-side member, a damper unit transmitting a mechanical power together with a power source therebetween through the torque limiter unit, and a positioning structure radially setting the damper unit in place with respect to the torque limiter unit.

The torque limiter unit includes a cover plate having an annular shape and a friction disc. The cover plate includes a friction portion having a disc shape and an attachment portion that is disposed radially outside the friction portion and is offset from the friction portion in an axial direction. The friction disc is pressed against the friction portion of the cover plate and is contactable at an outer peripheral end surface thereof with an inner surface of the cover plate. The positioning structure radially sets the damper unit in place with respect to the torque limiter unit by causing the friction disc to make contact at the outer peripheral end surface thereof with the inner surface of the cover plate.

(8) Preferably, the damper unit includes an input-side rotor to which the friction disc is fixed at an inner peripheral part thereof. An inner peripheral end of the cover plate and an outer peripheral end of the input-side rotor of the damper unit are disposed to be offset from each other in the axial direction.

(9) Preferably, the cover plate further includes a coupling portion that extends in the axial direction and couples the friction portion and the attachment portion therethrough. Additionally, the friction disc includes a core plate and a pair of friction members fixed to both surfaces of the core plate. Furthermore, an outer peripheral end surface of the core plate protrudes further radially outward than outer peripheral end surfaces of the pair of friction members so as to be contactable with an inner surface of the coupling portion of the cover plate.

Overall, according to the present invention described above, it is made possible to inhibit displacement in radial position of the damper unit with respect to the torque limiter unit.

DETAILED DESCRIPTION

[Entire Configuration]

Figure 1:
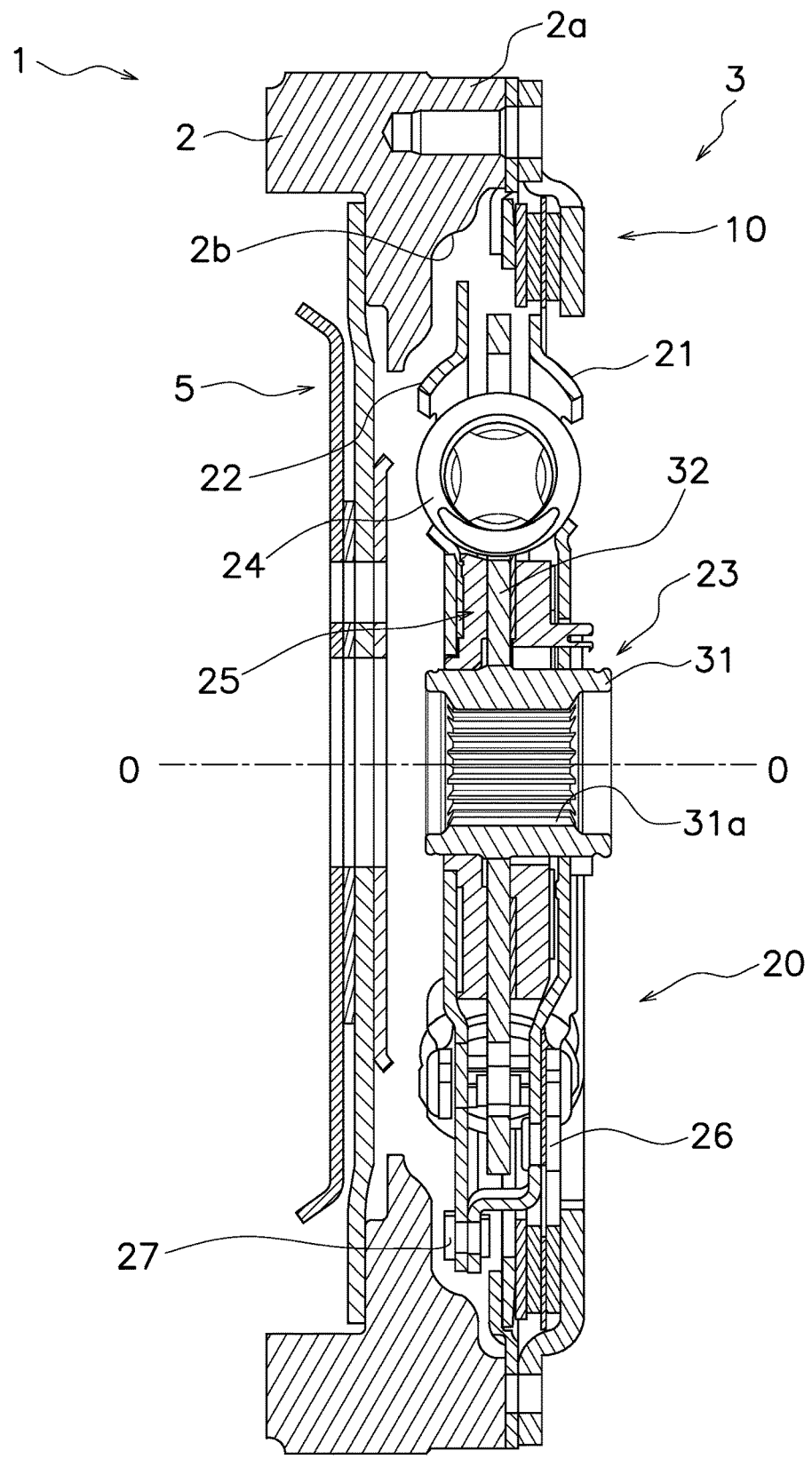
FIG. 1 is a cross-sectional view of a power transmission device including a damper device according to an embodiment of the present invention.
Figure 2:
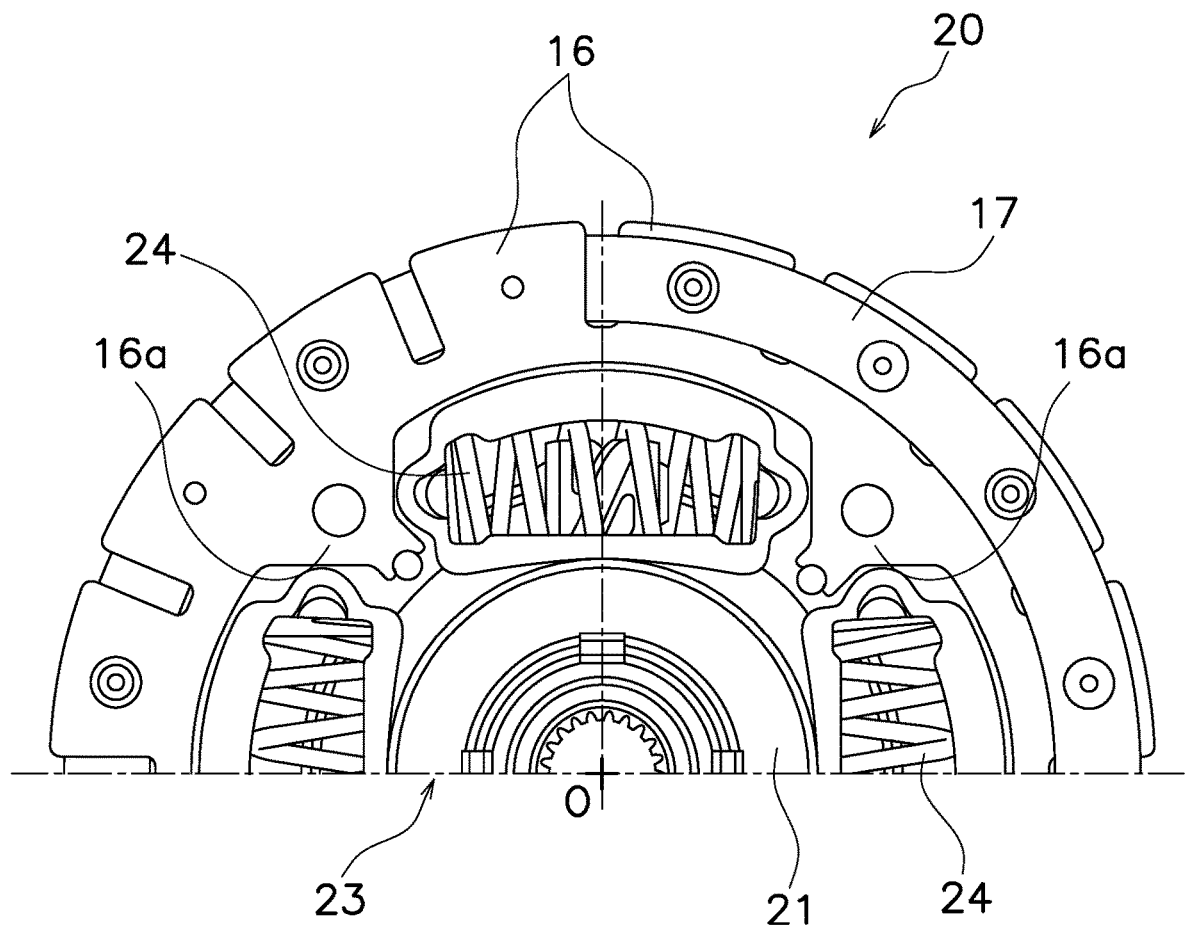
FIG. 2 is a partial front view of the damper device.

FIG. 1 is a cross-sectional view of a power transmission device 1 including a damper device according to an embodiment of the present invention. The power transmission device 1 includes a flywheel 2 and a damper device 3. On the other hand, FIG. 2 is a partial front view of the power transmission device 1 from which some components are removed. In FIG. 1, an engine is disposed on the left side of the power transmission device 1, whereas a drive unit, including an electric motor, a transmission, and so forth, is disposed on the right side of the power transmission device 1.

It should be noted that in the following explanation, the term "axial direction" refers to an extending direction of a rotational axis O of the damper device 3. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with the circumferential direction of the imaginary circle about the rotational axis O; likewise, the radial direction is not required to be perfectly matched with a diameter direction of the imaginary circle about the rotational axis O.

[Flywheel 2]

The flywheel 2 is fixed to an engine-side member (not shown in the drawings) through a flexible plate 5. As shown in FIG. 1, the flywheel 2 is a disc-shaped member and includes an annular portion 2a and an accommodation portion 2b.

The annular portion 2a is provided in the outermost peripheral part of the flywheel 2. A plurality of screw holes are provided on the drive unit-side surface (the surface disposed on a first side in the axial direction, i.e., the right side in FIG. 1) of the annular portion 2a; additionally, a plurality of knock pins are fixed to the drive unit-side surface of the annular portion 2a. The accommodation portion 2b is provided radially inside the annular portion 2a. The accommodation portion 2b has a predetermined depth from the attachment surface of the annular portion 2a to the engine side.

[Damper Device 3]

The damper device 3 is a device fixed to the first side of the annular portion 2a of the flywheel 2 in the axial direction in order to limit a torque transmitted between the engine and the drive unit and attenuate rotational fluctuations. The damper device 3 includes a torque limiter unit 10 and a damper unit 20.

[Torque Limiter Unit 10]

Figure 3:
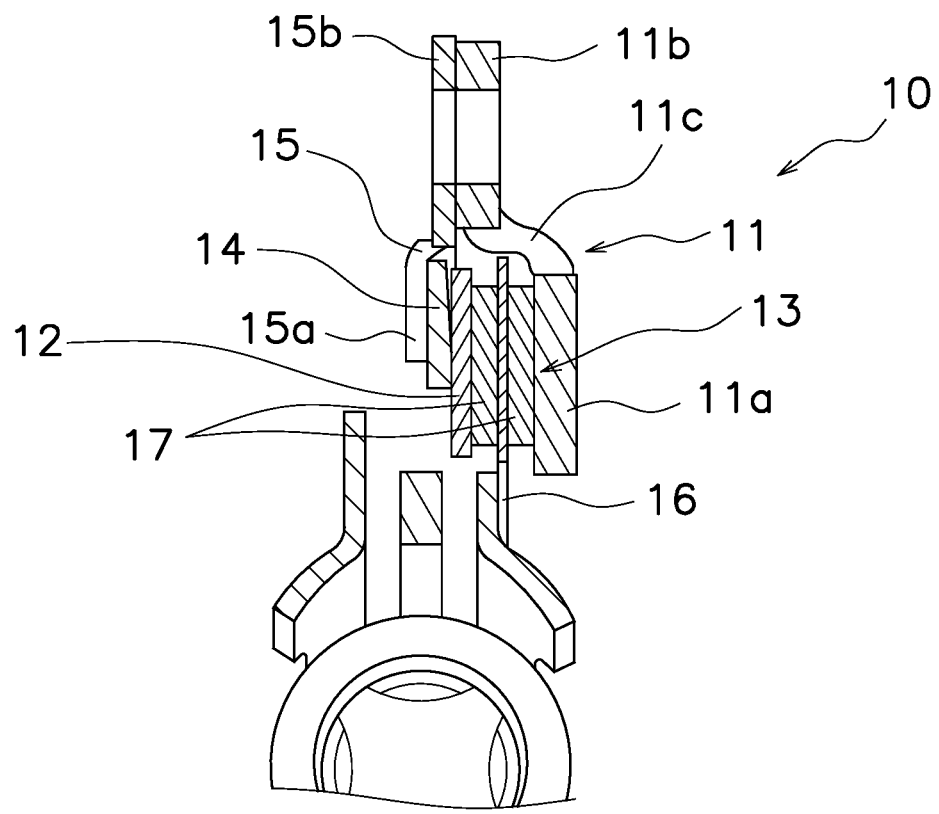
FIG. 3 is a partial closeup view of FIG. 1.

The torque limiter unit 10 limits a torque transmitted between the flywheel 2 and the damper unit 20. As shown close-up in FIG. 3, the torque limiter unit 10 includes a damper cover 11 (exemplary cover plate), a pressure plate 12, a friction disc 13, a cone spring 14, and a support plate 15.

The damper cover 11 is a plate including a friction portion 11a, an attachment portion 11b, and a coupling portion 11c.

The friction portion 11a, having a disc shape, is provided in the inner peripheral part of the damper cover 11. The attachment portion 11b is provided radially outside the friction portion 11a and is fixed to the annular portion 2a of the flywheel 2 through a plurality of bolts. The friction portion 11a is provided to be offset (displaced) from the attachment portion 11b to the first side in the axial direction. The coupling portion 11c is made in shape of a tube extending in the axial direction and couples the outer peripheral part of the friction portion 11a and the inner peripheral part of the attachment portion 11b.

The pressure plate 12, having an annular shape, is disposed on the second side of the friction portion 11a of the damper cover 11 in the axial direction and is also disposed in opposition thereto and away therefrom at a predetermined interval.

The friction disc 13 is disposed axially between the friction portion 11a of the damper cover 11 and the pressure plate 12. The friction disc 13 includes a core plate 16 and a pair of friction members 17 fixed to both lateral surfaces of the core plate 16 by a plurality of rivets. Here, one of the friction members 17 is in contact with the friction portion 11a of the damper cover 11, whereas the other is in contact with the pressure plate 12.

As shown in FIG. 2, the core plate 16, having an annular shape, includes a plurality of radial slits opened radially outward. The core plate 16 also includes a plurality of protruding portions 16a protruding radially inward from the inner peripheral surface thereof. The core plate 16 is shaped such that the outer peripheral end surface thereof protrudes from the outer peripheral end surfaces of the pair of friction members 17. In other words, the core plate 16 is shaped to be greater in outer diameter than the pair of friction members 17. Additionally, the outer peripheral end surface of the core plate 16 is radially opposed to the inner peripheral surface of the coupling portion 11c of the damper cover 11 at a predetermined gap (of, e.g., 0.5 to 1.0 mm).

The cone spring 14 is disposed on the second side of the pressure plate 12 in the axial direction; furthermore, the support plate 15 is disposed on the second side of the cone spring 14 in the axial direction. In other words, the cone spring 14 is disposed between the pressure plate 12 and the support plate 15 and presses the friction disc 13 against the friction portion 11a of the damper cover 11 through the pressure plate 12.

The support plate 15 includes a support portion 15a and an attachment portion 15b. The support portion 15a has an annular shape and is provided in the inner peripheral part of the support plate 15. The support portion 15a is axially opposed to the pressure plate 12 and interposes and holds the cone spring 14 together with the pressure plate 12 therebetween.

The attachment portion 15b includes a plurality of fixation holes. The support plate 15 is fixed together with the damper cover 11 to the annular portion 2a of the flywheel 2 by the bolts passing through the fixation holes, respectively.

[Damper Unit 20]

As shown in FIG. 1, the damper unit 20 includes a pair of a clutch plate 21 (exemplary first plate) and a retaining plate 22 (exemplary second plate), a hub flange 23, a plurality of torsion springs 24, and a hysteresis generating mechanism 25.

Here, the outer peripheral end of the clutch plate 21 and that of the retaining plate 22 are disposed on the second side of the friction portion 11a of the damper cover 11 (i.e., the inner peripheral end of the damper cover 11) in the axial direction.

The core plate 16 of the friction disc 13 is fixed at the protruding portions 16a to the axially first side lateral surface of an outer peripheral part of the clutch plate 21 by a plurality of rivets 26. The clutch plate 21, having a disc shape, includes a plurality of window portions. The retaining plate 22 is disposed on the second side of the clutch plate 21 in the axial direction and is also disposed in opposition thereto and away therefrom at an interval in the axial direction. The retaining plate 22, having a disc shape, includes a plurality of window portions provided in opposed positions to those provided in the clutch plate 21. The clutch plate 21 and the retaining plate 22 are fixed to each other by one or more rivets 27, while being immovable relative to each other in both axial and rotational directions.

The hub flange 23 includes a hub 31 and a flange 32. The hub, having a tubular shape, is provided in the center part of the hub flange 23. The flange 32 extends radially outward from the outer peripheral surface of the hub 31. The hub flange 23 is rotatable relative to the clutch plate 21 and the retaining plate 22. The hub 31 and the flange 32 are coupled to each other so as to be non-rotatable relative to each other.

The hub 31 is provided with a spline hole 31a on the inner peripheral surface thereof, whereby an input shaft of the drive unit is enabled to be spline-coupled to the spline hole 31a. The flange 32, having a disc shape, is disposed axially between the clutch plate 21 and the retaining plate 22. The flange 32 includes a plurality of accommodation portions. The accommodation portions are provided in corresponding positions to the window portions of the clutch plate 21 and those of the retaining plate 22, respectively.

The plural torsion springs 24 are accommodated in the accommodation portions of the flange 32, respectively, while being held in both axial and radial directions by the window portions of the clutch plate 21 and those of the retaining plate 22, respectively. Both circumferential end surfaces of each torsion spring 24 are contactable with the circumferential end surfaces of each triad of the window portion, the accommodation portion, and the window portion.

The hysteresis generating mechanism 25 includes a plurality of bushings, a cone spring, and so forth. The hysteresis generating mechanism 25 generates a friction resistance (hysteresis torque) when relative rotation is caused between the hub flange 23 and the pair of the clutch plate 21 and the retaining plate 22.

[Positioning Structure]

In the present embodiment, the outer peripheral end of the damper unit 20 (speaking in detail, the outer peripheral end of the pair of the clutch plate 21 and the retaining plate 22) and the inner peripheral end of the damper cover 11 (speaking in detail, the inner peripheral end of the friction portion 11a) are offset (displaced) in the axial direction without being radially overlapped with each other. Therefore, radial movement of the damper unit 20 cannot be restricted by, for instance, causing a constituent member of the damper unit 20 to make contact at the outer peripheral part thereof with the damper cover 11 of the torque limiter unit 10.

To cope with this, as described above, the following configurations are provided in the present embodiment. The core plate 16 is shaped to be greater in outer diameter than the friction member 17; additionally, the outer peripheral end surface of the core plate 16 is radially opposed to the inner peripheral surface of the coupling portion 11c of the damper cover 11 at a predetermined gap (of, e.g., 0.5 to 1.0 mm).

Because of this, when the damper unit 20 is radially displaced during rotation, the outer peripheral end surface of the core plate 16 fixed to the damper unit 20 is contacted to the inner surface of the coupling portion 11c of the damper cover 11, whereby the displacement is restricted. In other words, the damper unit 20 is radially set in place with respect to the torque limiter unit 10 by the contact between the outer peripheral end surface of the core plate 16 and the inner peripheral surface of the coupling portion 11c.

Specifically, the core plate 16 has a flat plate shape without being processed by bending or so forth; hence, it is made possible to control the radial dimension of the core plate 16 easily and accurately at the outer peripheral end surface thereof. Therefore, by cutting the inner peripheral surface of the coupling portion 11c as an object contacted by the core plate 16, it is made possible to strictly control the gap between the core plate 16 and the inner peripheral surface of the coupling portion 11c. Because of this, it is made possible to reduce radial displacement of the damper unit 20 with respect to the torque limiter unit 10 to a small extent.

[Actions]

Mechanical power, transmitted from the engine to the flywheel 2, is inputted to the damper unit 20 through the torque limiter unit 10. In the damper unit 20, the mechanical power is inputted to the clutch plate 21, to which the friction disc 13 of the torque limiter unit 10 is fixed, and the retaining plate 22; then, the mechanical power is transmitted to the hub flange 23 through the torsion springs 24. Subsequently, the mechanical power is further transmitted from the hub flange 23 to the electric motor, the transmission, a power generator, and so forth disposed on an output side.

For example, in starting the engine, chances are that an excessive torque is transmitted from the output side to the engine because the amount of inertia is large on the output side. In such a case, the magnitude of torque to be transmitted to the engine side is limited to a predetermined value or less by the torque limiter unit 10.

[Other Embodiments]

The present invention is not limited to the embodiment described above, and a variety of changes or modifications can be made without departing from the scope of the present invention.

(a) The configuration of the gap between the outer peripheral end surface of the core plate 16 and the inner peripheral surface of the coupling portion 11c of the damper cover 11 is exemplary only; hence, the gap is not limited to this configuration.

(b) In the embodiment described above, the outer peripheral end surface of the core plate 16 of the friction disc 13 is configured to be contactable with the inner peripheral surface of the damper cover 11; alternatively, another part of the friction disc 13, for instance, the outer peripheral end surfaces of the friction members 17 may be configured to be contactable therewith.

(c) In the embodiment described above, the present invention has been applied to the device that the flywheel 2 is coupled to the engine-side member through the flexible plate 5; however, an application target of the present invention is not limited to the device described above.

(d) The positioning structure in the present invention is not limited to that in the embodiment described above. For example, the outer peripheral end of the retaining plate 22 of the damper unit 20 may be configured to be contacted with a constituent component of the torque limiter unit 10.

(e) In the embodiment described above, the present invention has been applied to the device that the outer peripheral end of the damper unit 20 is disposed on the second side of the inner peripheral end of the damper cover 11 in the axial direction; however, the positional relation between the outer peripheral end of the damper unit 20 and the inner peripheral end of the damper cover 11 is not limited to that in the embodiment described above when the positioning structure is formed by causing the friction discs 17 to make contact at the outer peripheral end surfaces thereof with the inner surface of the damper cover 11.

REFERENCE SIGNS LIST

2 Flywheel (power source-side member)
3 Damper device
5 Flexible plate
10 Torque limiter unit
11 Damper cover (cover plate)
13 Friction disc
16 Core plate
17 Friction member
20 Damper unit
21 Clutch plate (first plate)
22 Retaining plate (second plate)

What is claimed is:

1. A damper device attachable to a power source-side member, the damper device comprising:
   a torque limiter unit attached to the power source-side member;
   a damper unit transmitting a mechanical power together with a power source therebetween through the torque limiter unit; and
   a positioning structure radially setting the damper unit in place with respect to the torque limiter unit, wherein
   the torque limiter unit includes
      a cover plate having an annular shape, the cover plate including a friction portion and an attachment portion, the friction portion having a disc shape, the attachment portion disposed radially outside the friction portion, the attachment portion offset from the friction portion in an axial direction, and
      a friction disc pressed against the friction portion of the cover plate, the friction disc contactable at an outer peripheral end surface thereof with an inner surface of the cover plate, and
   the positioning structure radially sets the damper unit in place with respect to the torque limiter unit by causing the friction disc to make contact at the outer peripheral end surface thereof with the inner surface of the cover plate.

2. The damper device according to claim 1, wherein
the damper unit includes an input-side rotor to which the friction disc is fixed at an inner peripheral part thereof, and
an inner peripheral end of the cover plate and an outer peripheral end of the input-side rotor of the damper unit are disposed to be offset from each other in the axial direction.

3. The damper device according to claim 1, wherein
the cover plate further includes a coupling portion, the coupling portion extending in the axial direction, the coupling portion coupling the friction portion and the attachment portion therethrough,
the friction disc includes a core plate and a pair of friction members, the pair of friction members fixed to both surfaces of the core plate, and
an outer peripheral end surface of the core plate protrudes further radially outward than outer peripheral end surfaces of the pair of friction members so as to be contactable with an inner surface of the coupling portion of the cover plate.

4. A damper device attachable to a power source-side member, the damper device comprising:
   a torque limiter unit including a cover plate, the cover plate having an annular shape, the cover plate configured to be fixed to a surface of the power source-side member on a first side of the power source-side member in an axial direction;
   a damper unit disposed such that an outer peripheral end thereof is located on a second side of an inner peripheral end of the cover plate in the axial direction, the damper unit transmitting a mechanical power together with a power source therebetween through the torque limiter unit;
   a positioning structure radially setting the damper unit in place with respect to the torque limiter unit;
   wherein
      the cover plate includes a friction portion and an attachment portion, the friction portion having a disc shape, the attachment portion disposed radially outside the friction portion, the attachment portion attached to the power source-side member, the torque limiter unit further includes a friction disc, the friction disc disposed on the second side of the friction portion of the cover plate in the axial direction, the friction disc pressed against the friction portion, the damper unit includes an input rotor, the input rotor having a disc shape, the input rotor disposed such that an outer peripheral end thereof is located on the second side of the friction portion of the cover plate in the axial direction, the input rotor receiving the friction disc at the outer peripheral end thereof such that the friction disc is fixed at an inner peripheral part thereof to a lateral surface of the outer peripheral end of the input rotor on the first side of the input rotor in the axial direction, the positioning structure radially sets the damper unit in place with respect to the torque limiter unit by making an outer peripheral end surface of the friction disc contactable with the cover plate of the torque limiter unit, the friction portion of the cover plate is offset from the attachment portion to the first side in the axial direction, the cover plate further includes a coupling portion, the coupling portion extending in the axial direction, the coupling portion coupling the friction portion and the attachment portion therethrough, and the outer peripheral end surface of the friction disc is contactable with an inner surface of the coupling portion.

5. The damper device according to claim 1, wherein the friction disc includes a core plate and a pair of friction members, the pair of friction members fixed to both surfaces of the core plate, and an outer peripheral end surface of the core plate protrudes further radially outward than outer peripheral end surfaces of the pair of friction members so as to be contactable with the inner surface of the coupling portion of the cover plate.

6. The damper device according to claim 5, wherein the input rotor of the damper unit includes a first plate receiving the core plate at an outer peripheral end thereof such that the core plate is fixed at an inner peripheral end thereof to a lateral surface of the outer peripheral end of the first plate on the first side of the first plate in the axial direction, and a second plate disposed in opposition to the first plate on the second side of the first plate in the axial direction, the second plate fixed to the first plate so as to be non-rotatable relative thereto.

7. The damper device according to claim 1, wherein the power source-side member is fixed to the power source through a flexible plate.

* * * * *